H. MARSHALL.
AUTOMATIC SYNCHRONIZER.
APPLICATION FILED OCT. 6, 1906.
932,877.  Patented Aug. 31, 1909.
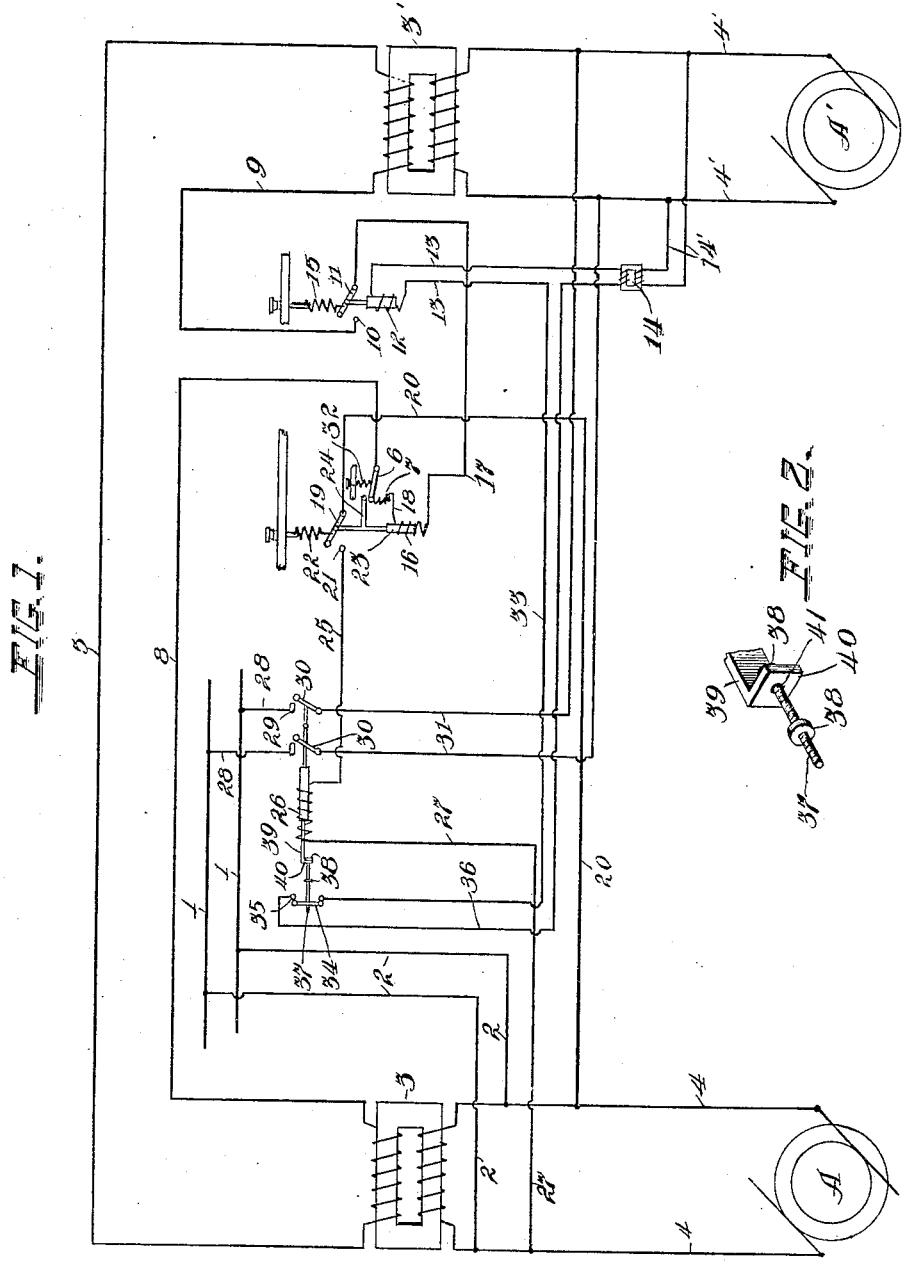

UNITED STATES PATENT OFFICE.

HOWARD MARSHALL, OF VANCE, COLORADO.

AUTOMATIC SYNCHRONIZER.

932,877.  Specification of Letters Patent.  Patented Aug. 31, 1909.

Application filed October 6, 1906. Serial No. 337,779.

*To all whom it may concern:*

Be it known that I, HOWARD MARSHALL, a citizen of the United States, residing at Vance Junction, in the county of San Miguel and State of Colorado, have invented certain new and useful Improvements in Automatic Synchronizers, of which the following is a specification.

My invention relates to improvements in automatic synchronizers for use in connecting an alternator to the bus bars with which another alternator has already been coupled, at the moment when such first-mentioned alternator is "in step" with the alternator connected to the bus bars.

It is well known that the currents of two or more alternating current machines do not, as a general rule, coincide in phase and frequency, even when such machines are of the same construction and are operated by the same shaft and motors or lamps connected to the external circuit will work very irregularly, thus demonstrating the practical impossibility of connecting the alternating current machines one after the other with the external circuit even though the electro-motive force be of the same value in each machine, and the best results cannot be obtained.

Hitherto it has been the common practice to connect two or more lamps to the circuit between the transformers which lamps are carefully watched by a man stationed at the switch who will throw the switch by hand when the lamps are at their brightest or are dark, depending on the manner in which the lamps are connected. Thus if the lamps are cross-connected between corresponding phase leads of the generators or other machine to be coupled, the switch must be closed when the lamps are brightest, but if the lamps are direct-connected between the phase leads, then the switch must be closed when the lamps are dark.

Economy of current results from coupling the alternate current machines in parallel and the greatest economy is obtained when such machines are coupled when substantially in step, and when they coincide in phase and frequency, or synchrony.

When the machine in action is running at a normal speed and the incoming machine is just started, a very rapid flickering of the lamps may be noticed, but as the speed of the incoming machine increases, such flickering becomes less rapid and by degrees, as the speed approaches that which is required for synchronism, there appear regular waves or "beats" in the light, the time between the recurrence as well as the duration of which becomes longer and longer. The attendant then must close the switch at the instant when the pressure is at its highest, if the lamps be cross connected, or at its lowest if the lamps are direct-connected, and thereafter the machines will remain properly coupled in parallel, but should a mistake occur great danger as well as serious injury to the circuit and generators is the result.

I am also aware that prior to my application, devices have been invented for automatically accomplishing the coupling of alternating current machines, but I claim for mine that it is simple and inexpensive, not complicated, and will positively cause the coupling of the machines at the proper time.

To this end, my invention consists in certain novel features and combinations such as will be more fully described hereinafter and particularly pointed out in the claims.

In the accompanying drawing Figure 1 is a diagrammatic view of my invention, and Fig. 2 is a detail of the circuit breaker which is connected to the solenoid.

The accompanying drawing discloses a diagrammatic representation of my invention in which A, A', indicate the alternating current generators, generator A being already coupled to the external circuit and generator A' being the incoming machine.

Of course, it it obvious that my invention may be employed where more than one generator or other alternate-current machine is to be synchronized with an alternate current machine previously coupled or in circuit with the external circuit, but I have merely shown one additional generator which will amply illustrate my invention.

Alternator A, or the machine already in action, is connected to the alternating current bus bars 1, 1, forming a portion of the external circuit, by means of the conductors 2, 2. Alternators A and A' are provided with the synchronizing transformers 3, 3' which I employ to avoid any mixing of the currents which might occur, the terminals of the respective primaries of which transformers are connected with the phase leads of the alternate-current machines by means of the conductors 4, 4, 4', 4', and the opposite poles of the secondaries of which are connected with each other by means of the conductor 5. The remaining pole or terminal of the secondary of transformer 3 is connected with the switch 6 of the rheostat or resistance box 7 by means of the conductor 8, as hereinafter referred to while the remaining pole or terminal of the secondary of transformer 3' is connected by means of the conductor 9 to the contact point 10 of the trip switch 11. The switch 6 is normally retained at one limit of its movement by means of a spring 32 one end of which is fastened to the switch arm, the opposite end of the spring being adjustably secured to any suitable support as shown. The pivoted lever arm of this trip switch 11, as I shall call it to differentiate from the synchronizing and closing switches hereinafter referred to, is connected to the core of a solenoid 12, the terminals of which solenoid are connected by means of conductors 13, 13 with the secondary of an auxiliary transformer 14, the primary of which is in direct connection with the proper phase leads of the incoming machine A', through the conductors 14', 14' by means of which the solenoid is energized. It will also be evident that I might employ an electro-magnet in place of the solenoid, if preferred. The lever arm 11 is normally retained in a position out of contact or engagement with its contact point 10 and against the pull of the core caused by the attraction of the solenoid coil, by means of the spring 15, the tension of which is adjustable to prevent the trip switch from closing until a suitable current is generated by the incoming machine, or in other words, until the incoming machine has been speeded up until the current thereof approaches that of the machine A already in action in phase and frequency.

The switch arm 11 is connected with the coil of the solenoid 16 operating the synchronizing switch by means of the conductor 17, the remaining terminal of the coil 16 being connected with a rheostat or resistance box 7, by means of the conductor 18, it being remembered that the arm or switch of the rheostat is connected with one terminal of the secondary of transformer 3 by means of the conductor 8. I have thus shown a complete circuit through the secondaries of the transformers 3, 3' which may be traced as follows: from one terminal of transformer 3, via. conductor 8 to the switch arm 6 of rheostat 7, thence through the rheostat and via. conductor 18 to and through the solenoid 16, thence through conductor 17 to the trip switch arm 11, and when the arm 11 is in engagement with switch or contact point 10 the current passes therethrough and along conductor 9 to one terminal of the transformer 3', through the transformer to the opposite terminal thereof and back to transformer 3 via. conductor 5.

The switch arm 19 of the synchronizing switch is suitably pivoted and is connected by means of the conductor 20 with one of the phase leads of the alternating machine A and the core of the synchronizing solenoid 16 is pivotally secured to the switch arm 19, which latter is normally retained out of contact with the switch or contact point 21 by means of an adjustable spring 22, arranged to overcome the premonitory fluctuations of the current as well as the weight of the core 23. The fluctuations of the core 23 are caused by the current flowing around the solenoid 16, and the spring 22 causes the switch arm 19 to be held at the proper tension. This spring will permit the core to move the switch arm up and down, not open and closed, until the alternations become long and slow enough so that the arm 24 will cut out the resistance in the rheostat 7, thereby closing the circuit by having switch 19 come in contact with the point 21.

The core 23 carries an arm 24 which projects into the path of travel of and engages the switch arm 6 of the rheostat 7 for a purpose hereinafter stated and the contact or switch point 21 is connected by means of conductor 25 with one terminal of solenoid 26 being connected with the opposite phase lead 4 of the alternating machine A, from that with which the synchronizing switch arm is connected by means of the conductor 27. I have now established a circuit traced from one of the phase leads 4 of the alternating machine A through conductor 20 to the synchronizing switch arm 19, thence to contact point 21 through conductor 25 to the closing or circuit breaking switch solenoid 26, and thence returning to the remaining phase lead 4 of the alternator A through the conductor 27.

The bus bars 1, 1, are each provided with conductors 28, 28 which lead to separated contact points 29, 29 adapted to be simultaneously engaged by the pivoted switch arms 30, 30 of a circuit breaker which is automatically operated by means of the solenoid 26 and may also be operated manually by the ordinary knobs on the arms, the switch arms being controlled by the core of the closing switch solenoid 26 to which they are connected, the switch arms likewise being connected with the phase leads of the incoming alternator or machine A' by means of the conductors 31, 31, the circuit last described being obvious, and it need not be stated that the switch arms 11, 19 and 30, 30, are suitably insulated from the cores of solenoids 12, 16 and 26, respectively. Also that the arm 24 is insulated from the switch 6 of the rheostat 7.

To one of the conductors 13 leading from the auxiliary transformer 14 is connected a wire 33 leading to the auxiliary switch arm 34, the free end of which is movable toward and from a contact point 35 from which latter a wire 36 returns to the auxiliary transformer 14. The switch arm 34 carries a rod 37 upon which the collars 38, 38 are adjustably mounted.

The circuit breaker solenoid is provided with a rearward extension 39 of suitable non-conducting material as wood fiber, to the free end of which extension is secured a plate 40 having an aperture 41 therein for receiving the rod 34, the plate 40 being located between the collars 38, 38 against either of which the plate impinges to open or close the auxiliary switch. The circuit from the auxiliary transformer 14 is traced as follows; from one terminal of the transformer along conductor 13 to the solenoid 12, thence back along the remaining wire 13 to wire 33, to switch arm 34 and when the latter is on its contact 35, through the switch to the contact and returning along wire 36 to the transformer 14.

When the circuit breaker is open, that is to say, when the switch arms 30, 30 are out of engagement with the terminals 29, 29, the extension 39 of the solenoid has engaged the outermost collar on the rod 37 to close the switch, and simultaneously with the engagement of the switch arms 30, 30 with their elongated terminals, the extension 39 engages the innermost collar on rod 37 to open the switch 34 and thus break the circuit between the auxiliary transformer 14 and the trip switch solenoid 12.

When the switch arms 30 are closed, the bar 39 pushes the switch 24 open, and when the circuit through solenoid 12 is open it will open the circuit through the solenoid 26, which is done automatically, but heretofore it was necessary to operate the circuit breaker by hand.

The operation of my device is as follows: The alternator A is started and being in direct connection with the bus bars, a current is conveyed thereto, but it is desired to use a stronger current, and hence alternator A' is started up, the second alternator probably being operated by the same shaft as is alternator A. The circuit between the secondaries of the transformers 3, 3', however, remains open at the switches 11 and 19 until a sufficient current has been generated by the incoming machine A' to cause the attraction of the coil of the solenoid 12 on the core to overcome the force of the spring 15, whereupon the arm 11 is brought into contact with the contact point 10 and the trip circuit heretofore described is established, energizing the synchronizing solenoid 16 which attracts the core 23, but owing to the fluctuation or pulsations of the current now weak, now strong, the core 23 is reciprocated at first rapidly and but a short distance each way, subsequently more slowly in accordance with the recurrence of the beats or impulses in the trip circuit and the core making longer and longer reciprocations. As the core 23 reciprocates, it carries with it the arm 24 which engages and causes an oscillation of the switch 6 of the rheostat 7 against the tension of its spring 32, thereby cutting in or out more or less resistance in the secondary or tripping circuit; and likewise the core oscillates the switch arm 19 to which it is connected against the tension of the spring 22, the oscillations of the switch arm gradually taking a longer arc. This gradually slower and longer reciprocatory and oscillatory movement of the parts continues as the current of the incoming machine approaches in phase and frequency, that of the machine A, already in action until just at the moment when the incoming current has synchronized itself with the current furnished by alternator A, and is at its highest point, the core 23 brings the switch 19 into engagement with contact point 21 completing the synchronizing circuit and thereby energizing the solenoid 26 of the closing switch which promptly attracts its core and closes the switches 30, whereby the current from the incoming machine is shunted along conductors 31, 31 to conductors 28, 28, and bus bars 1, 1, through the switches 30, 30, the first rush of the current pulling the machines "dead into step."

From the foregoing it will be observed that the various circuits will still be energized after the closing of switches 30, 30 until the switch 11 is broken and I have devised means whereby these auxiliary circuits will be automatically broken upon the closing of the main switch 30, 30 and to this end I have devised the auxiliary switch 34 which is operated by the solenoid 26 of the main or circuit making and breaking switch in the manner heretofore described, whereby the trip switch circuit 13 is broken, deënergizing the solenoid 12 to cause the release of the switch arm 11 which breaks the circuit between the secondaries of the generators, permitting the springs 22 to move switch arm 19 away from its contact point 21 and also permit spring 32 to move the rheostat arm 6 to its limit of movement in one direction to cut out all resistance, the arm 24 of the solenoid core 23 always lying on one side of the switch 6. Thus it will be seen that the switches operate with a close relationship to one another and that the incoming machine will not be coupled in until a phase and frequency or alternation corresponding with that of the working machine is obtained, owing to the fact that short impulses will not actuate the synchronizing switch a sufficient distance to cause its contact with switch point 21.

The synchronizer will effect the coupling up of alternating currents with a reliability, precision and safety not obtainable by the old method of hand coupling.

It is understood, of course that the speed of the incoming machine is adjusted as necessary and that many changes might be made in the form and arrangement of the several features described without departing from the spirit and scope of my invention, and hence I do not wish to limit myself to the exact construction herein shown, but Having fully described my invention, what I claim as new and desire to secure by Letters Patent, is:—

1. The combination with two or more alternating current machines, bus bars, leads connecting the bus bars with one of the machines, transformers with which each machine is connected, a conductor connecting the secondaries of the transformers, a trip switch, a synchronizing switch, separate electro-responsive means for operating the switches, a resistance member connected with the operating means of the synchronizing switch, the operating means of the synchronizing switch connected with the trip switch, a contact point engaged by the trip switch, the contact point connected with the secondary of one of the transformers, means connecting the resistance member with the remaining transformer, the synchronizing switch connected with a lead of one of the alternating machines, a contact point engaged by the synchronizing switch, a closing switch, and actuating means of the closing switch connected with the other of the leads of the alternating machine, and a circuit between the other alternating machine and the bus bars, the last named circuit controlled by the closing switch.

2. The combination with an alternating current circuit, of an incoming machine, conductors connecting the machine and circuit, a closing switch controlling the continuity of the conductors, an electro-magnet connected to the closing switch for controlling the switch, a synchronizing switch comprising operated and operating members, the operated member connected with the electro-magnet when the synchronizing switch is closed and causing the electro-magnet to operate the closing switch, a secondary or trip circuit, a resistance therein, means actuated by the operating member of the synchronizing switch for controlling the resistance and means for controlling the secondary circuit.

3. The combination with an alternating current circuit, of an incoming machine, conductors for connecting the incoming machine, and circuit, a closing switch controlling the continuity of the conductors, a synchronizing switch comprising an operated and an operating member, a secondary circuit, a resistance therein, a switch arm in the secondary circuit controlling the resistance, means connecting the operating member of the synchronizing switch and the resistance switch arm, restraining means connected to the operated member of the synchronizing switch and means for controlling the secondary circuit.

4. The combination with an alternating current circuit, of an incoming machine, conductors connecting the machine and circuit, a closing switch controlling the continuity of the conductors, a vibrating synchronizing switch controlling the closing switch, a resistance automatically controlled by the synchronizing switch and a secondary circuit with which the resistance is connected, a switch controlling the secondary circuit, conductors connecting the last named switch and the incoming machine, and an auxiliary transformer with which the conductors connect.

5. The combination with an alternating current machine, connected with an external circuit and an incoming machine, to be coupled in parallel therewith, of a secondary circuit, means controlled by the incoming machine for completing the secondary circuit, a closing switch for completing the coupling of the incoming machine with the external circuit, a resistance in the secondary circuit, and a vibrating means controlled by the secondary circuit for automatically operating the resistance and controlling the coupling switch.

6. The combination with a plurality of alternating current machines to be coupled in parallel, of a circuit including the machines, a resistance in the circuit and a vibrating switch controlled by the circuit and automatically operating the resistance to determine the precise moment for coupling.

7. The combination with the bus bars of an external circuit, a working alternating current generator and an incoming alternating current generator, of transformers with the primaries of which the leads of each generator are connected, separate conductors connecting the leads of the generators with the bus bars, the conductors connected to the leads at points intermediate the generators and their respective transformers, conductors connecting the secondaries of the transformers with each other, a closing switch located in circuit with the conductor extending between the incoming generator and the bus bars, means for operating the closing switch controlled by current from the working generator, a trip switch located in circuit with one of the conductors connecting the secondaries of the transformers, means controlled by the closing switch and actuated by current from the incoming machine for operating the trip switch, a synchronizing switch in circuit with the working generator and controlling the current therefrom relative to the operating means for the closing switch, and operating means in circuit with the last named conductor connecting the secondaries of the transformers and controlled by the trip switch for actuating the synchronizing switch.

8. The combination with a working alternating current generator and incoming alternating current generator and transformers, the primaries of which are connected with each generator, of an external circuit, means connecting the external circuit with the generators at points intermediate the generators and transformers, separate conductors connecting the opposite poles of the secondaries of the transformers, a trip switch controlling the continuity of the secondary circuit, means deriving its current from the incoming generator for operating the trip switch, an auxiliary switch in circuit with the trip switch operating means for controlling the actuation of such operating means, a closing switch controlling the coupling of the incoming generator with the external circuit, the closing switch also controlling the auxiliary switch, a synchronizing switch in circuit with the closing switch and means connected with the secondary circuit and controlled by the trip switch for operating the synchronizing switch.

9. The combination with an external circuit, a working alternating current generator connected therewith, and an incoming generator, of a circuit connection between the incoming machine and the external circuit, a closing switch controlling the circuit connection, a synchronizing switch in circuit with and controlling the movement of the closing switch, a secondary circuit energized from each of the generators, a trip switch in the secondary circuit, means energized by current from the secondary circuit for actuating the synchronizing switch, the trip switch controlling the energization of the synchronizing switch operating means, trip switch operating means, and means in circuit with the trip switch operating means and controlled by the closing switch for opening and closing the circuit in which the trip switch operating means is located.

10. The combination with an external circuit, a working alternating current generator connected therewith and an incoming alternating current generator, of means for connecting the incoming generator with the external circuit, a closing switch controlling the connection, a secondary circuit connecting the generators, a trip switch and a synchronizing switch operating means connected in series in the secondary circuit, and an auxiliary circuit energized from the incoming generator, a trip switch operating means and an auxiliary switch operating means connected in series in the auxiliary circuit, a circuit energized from the working generator, the closing switch and a synchronizing switch connected in series in the last named circuit, the closing switch controlling the operation of the auxiliary switch.

11. The combination with an external circuit, a working alternating current generator connected therewith and an incoming alternating current generator, of means for connecting the incoming generator and the external circuit, a circuit energized by the working generator, means in the circuit for controlling the connection between the incoming generator and the external circuit, a secondary circuit energized by both generators, means in the secondary circuit for controlling the operation of the first named means, a make and break device in the secondary circuit controlling the energization thereof, an auxiliary circuit energized from the incoming generator, means in the auxiliary circuit for controlling the operation of the make and break device and a master switch in the auxiliary circuit controlled by the means controlling the connection between the incoming generator and the external circuit to cause the breaking of the circuit energized by the working generator the auxiliary and the secondary circuits.

12. The combination with an external circuit, a working alternating current generator connected therewith, and an incoming alternating current generator of a primary circuit energized from the working generator, a secondary circuit energized from both generators, an auxiliary circuit energized from the incoming generator, conductors for connecting the incoming generator to the external circuit, a closing switch in the primary circuit controlling the continuity of the conductors, a make and break device controlling the continuity of the primary circuit, means in the secondary circuit controlling the make and break device, a make and break device controlling the secondary circuit, means in the auxiliary circuit for controlling the last named make and break device, and a master make and break device in the auxiliary circuit controlled by the closing switch for controlling the auxiliary circuit.

13. The combination with a working alternating current generator, an external circuit connected therewith and an incoming generator, of transformers to the primaries of which the generators are directly connected, conductors connecting the opposite terminals of the secondaries of the transformers with each other, leads for connecting the incoming generator and the external circuit, a closing switch controlling the leads, electrically connected means controlled by the fluctuations of the incoming machine for operating the closing switch, and a master make and break device controlled by the closing switch for controlling the operation of the electrically connected means.

In testimony whereof I affix my signature in presence of two witnesses.

HOWARD MARSHALL.

Witnesses:
 XAVER H. BEFFORT,
 PERRY S. DARGER.